J. KLIPPER.
SIGNAL DEVICE FOR AUTOMOBILES.
APPLICATION FILED FEB. 20, 1919.
1,342,049.
Patented June 1, 1920.
2 SHEETS—SHEET 1.
- FIG. 1 -
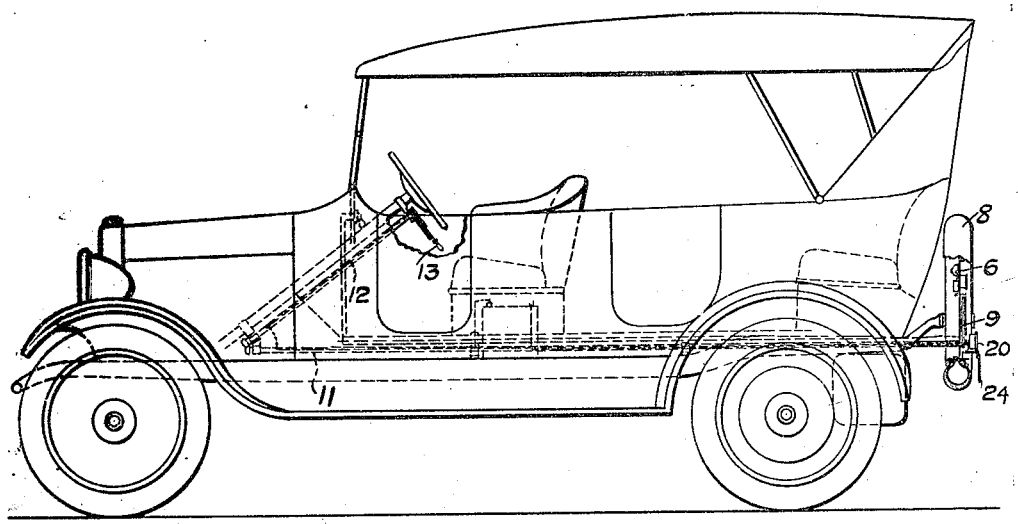
- FIG. 2 -
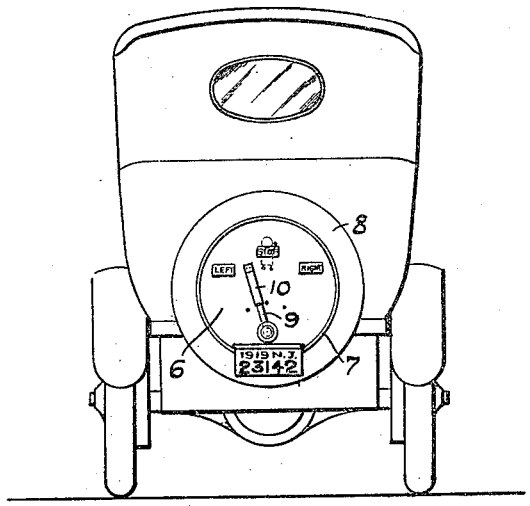
INVENTOR
Joseph Klipper
by Edward H. Wright
Atty J. KLIPPER.
SIGNAL DEVICE FOR AUTOMOBILES.
APPLICATION FILED FEB. 20, 1919.
1,342,049.
Patented June 1, 1920.
2 SHEETS—SHEET 2.
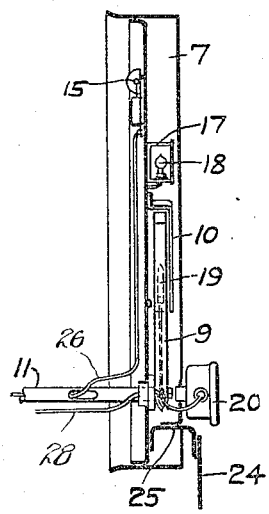
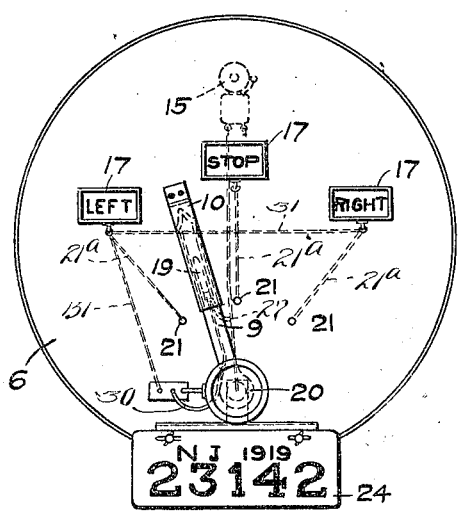
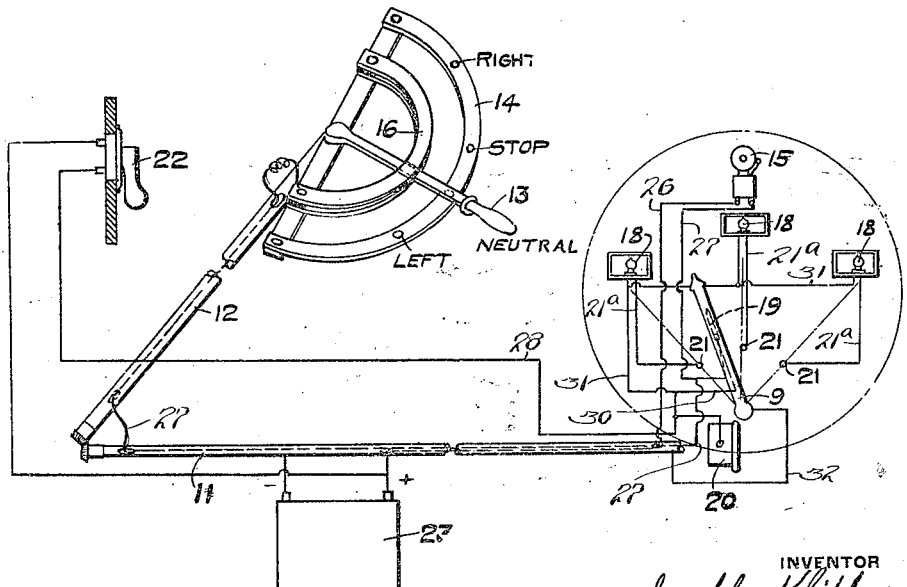
INVENTOR
Joseph Klipper
by Edward A. Wright
Atty.

UNITED STATES PATENT OFFICE.

JOSEPH KLIPPER, OF WEST NEW YORK, NEW JERSEY.

SIGNAL DEVICE FOR AUTOMOBILES.

1,342,049.            Specification of Letters Patent.      Patented June 1, 1920.

Application filed February 20, 1919. Serial No. 278,180.

*To all whom it may concern:*

Be it known that I, JOSEPH KLIPPER, a citizen of the United States, residing at West New York, in the county of Hudson and State of New Jersey, have invented a certain new and useful Improvement in Signal Devices for Automobiles, of which the following is a specification.

This invention relates to signal devices for automobiles, motor trucks, or other vehicles, whereby the driver may give an indication, at the rear of his vehicle, of an intention to change direction, slow up, or stop, for the guidance of following vehicles; the object being to provide a simple and durable construction of this character, which may be easily manufactured and readily applied, at low cost, to any type of automobile or motor truck.

The common practice for a driver to indicate his intention of turning a corner, or changing his direction, is to extend his arm to one side or the other, but on account of obstructions, and the width of certain motor trucks, and also in the case of closed cars, it is often difficult, and sometimes impossible, to give any adequate signal in this manner, which may be seen by following vehicles, and many accidents have also occurred by failure to give a timely warning by proper signals to those following closely behind.

It is important that the signal device should be adapted to give its indication in advance of the actual turning of the vehicle, as this would ordinarily be too late to serve as a timely warning, particularly on crowded thoroughfares of rapidly moving traffic. According to my improvement, a base plate or frame carrying the fixed indications, such as "left", "right", and "stop", is mounted at the rear of the vehicle, and a movable arm or pointer is arranged to be turned from one indication to another by a suitable mechanical transmission operated by the driver, the pointer having an intermediate neutral position, in which it is covered by a fixed shield, and is invisible to those following. As the pointer is turned from its neutral position to give a certain indication, it emerges from beneath its shield, and is then plainly visible as it moves over its plate or background to the desired position.

In the accompanying drawings: Figure 1 is a side elevation of an automobile, with one form of my improvement applied thereto, the spare tire mounted at the rear of the car being broken away to show the signal device; Fig. 2, a rear elevation; Fig. 3, a vertical section of the signal device supported in the rim of the spare tire; Fig. 4, a rear elevation of the same; and Fig. 5, a diagrammatic view illustrating one arrangement of wiring that may be employed for the lighting system of the signal device.

The construction comprises a suitable support, frame, or base plate, 6, carrying indications, such as "left", "stop", and "right", and mounted in any suitable position at the rear of the vehicle. According to a preferred construction, however, the base plate, 6, may be fitted within the rim, 7, of the spare or emergency tire, 8, which is usually mounted at the rear of the automobile, as shown in Figs. 1 and 2. The movable arm or pointer, 9, is preferably pivotally mounted on the base plate, and is adapted to be turned over the base plate, as a background, to its different indicating positions. The background is preferably black, while the pointer or arrow is of a contrasting color, such as white, so as to be clearly visible for a considerable distance in the rear of the car. The neutral position of the arrow or pointer is preferably located between the indications "left", and "stop", and when in its neutral position, the pointer is covered and concealed by a shield, 10, which is rigidly supported upon the base plate, 6, but is free at its side edges to permit the pointer to swing freely beneath the same. When in its neutral position, therefore, the pointer or arrow is covered so as not to be visible from a position in the rear of the car, but as soon as the pointer is moved from its neutral position, either way toward an indicating position, it swings away from beneath its shield, and is plainly visible to the driver of a following vehicle, who is thereby immediately warned of an intention of the other driver to turn or stop.

Any suitable form of mechanical transmission may be employed by which the pointer may be turned by the driver, that shown in the drawing comprising a shaft, 11, extending from the base plate beneath the body of the car, and having a bevel gear connection with the shaft, 12, extending up to the handle, 13, which may be conveniently located beneath the driver's steering wheel, as indicated in Fig. 1. A quadrant bar, 14, may be provided having the usual notches for defining the positions of the handle corresponding to the respective indicating positions of the pointer, as will be readily understood.

In order to give an audible warning signal at the same time that the arrow is being turned to one of its indicating positions, an electric bell, 15, may be connected in a circuit with contact bars, 16, so that the circuit is closed by the handle, 13, whenever it is moved away from its neutral position. The contact bars, 16, are held separate by insulating blocks at their ends, and are also covered with insulation on their adjacent inner faces at the neutral position of the handle, 13, so that in that position the circuit is normally open, but will be closed by the handle, making contact with the bars, 16, when moved in either direction from said neutral position.

The circuit for the bell may be traced from the plus side of the battery, 23, through wire, 26, to the bell, 15, thence by wire, 27, through tubular shafting to one of the contact bars, 16, the other contact bar, 16, being grounded on the frame and thereby electrically connected with the return wire of the battery.

Another feature of my improvement relates to means for rendering the signal indication visible at night, or when it is dark, and for this purpose, the position indicators are formed of boxes or casings, 17, each containing a small electric lamp, 18, the top or cover of said casing being of white transluscent glass, with the indication marked thereon in black letters. The outer end portion of the pointer, 9, is also formed as a hollow casing with a white glass top and containing an electric lamp, 19. The wiring system for the signal lamps may be connected with the usual lighting system of the vehicle, as supplied from a battery, 23, so as to be illuminated when the usual light switch, 22, for the tail lamp, 20, is thrown on. If, however, it be preferred to have the pointer illuminated only when turned away from its neutral position, its lamp circuit may be connected with the contact bars, 16, in the same manner as the bell circuit so as to be automatically controlled by the movement of the handle, 13. This circuit may then be traced from the battery through the switch, 22, and by wires, 28 and 30, to the lamp, 19, on the arrow, and thence by return wires, 29 and 27, to contact bar, 16, of the handle, 13, as before described. It may also be desired to illuminate the indicating positions only at such times as the arrow is turned to point to any particular one, and in that case the circuits to the lamps, 18, may be controlled by the movement of the arrow itself by engagement with suitable contacts, 21, in its respective indicating positions, as shown in Figs. 4 and 5. When the arrow is turned to make contact with any one of the points, 21, as indicated in Fig. 5, by radial lines drawn from the center of the pivot of the arrow, the circuit is closed from wires, 28 and 31, to the lamp, 18, and thence by wire, 21ª, the arrow, 9, and ground wire, 32, to the frame and battery.

The number plate, 24, and tail lamp, 20, may be conveniently supported from the base plate, 6, by a bracket, 25.

Having now described my invention, what I claim as new and desire to secure by Letters Patent is:

1. In a vehicle signal device, the combination of a base plate mounted at the rear of the vehicle, and carrying fixed indications in different positions, a movable indicating arm carrying an electric lamp and having a neutral position intermediate of the other positions, a fixed shield covering said arm in its neutral position, a handle and mechanism adapted to be operated by the driver for moving said arm, and switch means operated by the movement of said handle to its neutral position to open the circuit to said lamp, and away from said position for closing said circuit.

2. In a vehicle signal device, the combination of a base plate mounted at the rear of the vehicle, and carrying fixed indications each having an electric lamp, a movable pointer mounted on said plate and also carrying an electric lamp, a handle and mechanism for moving said pointer to its respective positions, a switch for the pointer light controlled by the movement of said handle, and switch means for the fixed lights controlled by the movement of said pointer.

3. In a vehicle signal device, the combination of a base plate mounted at the rear of the vehicle and carrying fixed indications each having an electric lamp, a movable pointer mounted on said plate and also carrying an electric lamp, mechanism for moving said pointer to its respective positions, and for also controlling the circuit to said lamp on the pointer and switch means for said fixed light circuits controlled by the movement of said pointer.

In testimony whereof I have hereunto set my hand.

JOSEPH KLIPPER.